(12) United States Patent
Tanaka et al.

(10) Patent No.: US 7,996,857 B2
(45) Date of Patent: Aug. 9, 2011

(54) OPTICAL DISC APPARATUS

(75) Inventors: Yoshiyuki Tanaka, Kawasaki (JP); Ikuo Nishida, Ebina (JP); Hisahiro Miki, Chigasaki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 289 days.

(21) Appl. No.: 12/424,643

(22) Filed: Apr. 16, 2009

(65) Prior Publication Data

US 2010/0083291 A1  Apr. 1, 2010

(30) Foreign Application Priority Data

Sep. 29, 2008  (JP) .................................. 2008-250694

(51) Int. Cl.
*G11B 17/04* (2006.01)
(52) U.S. Cl. ........................................................ 720/609
(58) Field of Classification Search .................... 720/609
See application file for complete search history.

(56) References Cited

U.S. PATENT DOCUMENTS

| 6,922,837 | B2 * | 7/2005 | Chang | 720/609 |
| 7,325,242 | B2 * | 1/2008 | Yokota | 720/609 |
| 2004/0223420 | A1 | 11/2004 | Yokota | |
| 2007/0192781 | A1 | 8/2007 | Ahn | |

FOREIGN PATENT DOCUMENTS

| JP | 06-180918 | 6/1994 |
| JP | 2002-343010 | 11/2002 |
| JP | 2003-021165 | 1/2003 |
| JP | 2004-310813 | 11/2004 |
| JP | 2004-348814 | 12/2004 |
| JP | 2007-220276 | 8/2007 |

* cited by examiner

*Primary Examiner* — Adam R Giesy
(74) *Attorney, Agent, or Firm* — Antonelli, Terry, Stout & Kraus, LLP.

(57) ABSTRACT

The invention makes it possible to carry out an emergency eject motion without attaching and detaching teeth between gears in a transmission system of a driving force of a loading motor, in an optical disc apparatus. At least one of gear units in a gear train constructing a transmission system between a loading motor and a disc moving mechanism is structured such that a driving gear is coupled in an inner diameter side of a large diameter driven gear in such a manner as to be movable in an axial direction and be rotatable integrally with the driven gear, and the driving gear moves and displaces in an axial direction with respect to the driven gear, thereby being canceled the coupling with the driven gear while keeping an engagement with a gear in the next stage, canceling the coupling by an external force by a manual operation so as to set the transmission system to a disconnection state at a time of an emergency eject, making the disc moving mechanism carry out a disc discharge motion by the external force, and discharging an optical disc out of the apparatus.

13 Claims, 11 Drawing Sheets

US 7,996,857 B2

OPTICAL DISC APPARATUS

INCORPORATION BY REFERENCE

The present application claims priority from Japanese application JP2008-250694 filed on Sep. 29, 2008, the content of which is hereby incorporated by reference into this application.

BACKGROUND OF THE INVENTION (1) Field of the Invention

The present invention relates to a structure of an optical disc apparatus, and more particularly to a structure for discharging an optical disc at a time of an emergency, that is, carrying out an emergency eject.

(2) Description of Related Art

As a prior art in association with the present invention and a technique described in patent documents, for example, there are techniques described in JP-A-6-180918 (patent document 1), JP-A-2004-310813 (patent document 2) and JP-A-2007-220276 (patent document 3). In JP-A-6-180918, as a structure for picking up a cartridge of a recording medium from an apparatus at a time of an emergency (for an emergency eject), there is described a structure moving a final gear detachably engaging with a rack provided in a horizontal moving portion in an axial direction by a moving member so as to detach an engagement with the rack portion. In JP-A-2004-310813, there is described a structure pressing a slider member 31 by an emergency pin P at a time of carrying out an emergency eject so as to cancel an engagement between a worm gear 22 fixed to a rotation output shaft of a loading motor and a double gear 23 driven by the worm gear 22, push a gear member 36 by the emergency pin P in the canceled state, backward move a rack main body 34 via a double gear 38 and oscillate a discharge lever 17, thereby discharging an optical disc, in a disc apparatus. Further, in JP-A-2007-220276, there is described a structure pushing up a gear 305c in an axial direction via a gear moving portion 630 of a cancel lever 600 by a pin 700 so as to detach from a rack 355, at a time of carrying out an emergency eject, canceling an engagement between the gear 305c and the rack 355, and manually operating a main slider 350, in an optical equipment apparatus.

The prior art described in the publication mentioned above is structured such as to cancel the engagement between the teeth of the rack and the teeth of the gear, and the engagement between the teeth of the worm gear and the teeth of the gear, at a time of carrying out a discharge of the disc at a time of an emergency (hereinafter, refer to as an emergency eject), and again set the teeth of the gears to the engaged state at a time when the emergency eject motion is thereafter finished and the apparatus is returned to an initial state. Accordingly, in particular, in the case of setting the teeth to the engaged state between the gears, there is a risk that the teeth are damaged due to a contact between head portions of the teeth before coming to the engaged state, and it is necessary to make a positional relation between both the teeth proper for obtaining a proper engaged state. Accordingly, it is necessary to accurately regulate a moving direction and a stop position of the gear which is moved for achieving the engagement. Further, at a time of carrying out the cancellation of the engagement, a space in a vertical direction to an axis of rotation of the gear is necessary as a space in which the gear moves, and it is thought that this tends to cause an increase of a dimension of the apparatus.

BRIEF SUMMARY OF THE INVENTION

The present invention is made by taking the condition of the prior art mentioned above into consideration, and an object of the present invention is to make it possible to carry out an emergency eject motion without attaching and detaching teeth between gears having different axes in a gear train constructing a transmission system between a loading motor and a disc moving mechanism, in an optical disc apparatus.

An object of the present invention is to provide an optical disc apparatus which solved the problem mentioned above and can secure a reliability.

In order to solve the problem mentioned above, in accordance with the present invention, there is provided an optical disc apparatus in which at least one of gear units in a gear train (reference numeral 360 in the corresponding embodiment) constructing a transmission system between a loading motor (reference numeral 350 in the corresponding embodiment) and a disc moving mechanism is structured such that a driving gear (reference numeral 3602 in the corresponding embodiment) arranged in an inner diameter side of a large diameter driven gear (reference numeral 3601 in the corresponding embodiment) so as to be coaxial with the driven gear is coupled in such a manner as to be movable in an axial direction and be rotatable integrally with the driven gear, and the driving gear (reference numeral 3602 in the corresponding embodiment) moves and displaces in an axial direction with respect to the driven gear (reference numeral 3601 in the corresponding embodiment), thereby being canceled the coupling with the driven gear in a state of keeping an engagement with a gear (reference numeral 3603 in the corresponding embodiment) in the next stage (an engagement between teeth), canceling the coupling by an external force by a manual operation so as to set the transmission system to a disconnection state (an off state) at a time of an emergency eject, making the disc moving mechanism carry out a disc discharge motion by the external force, and discharging an optical disc out of the apparatus.

Specifically, in accordance with the present invention, there is provided an optical disc apparatus capable of carrying out an emergency eject motion of an optical disc, comprising:

a disc moving mechanism moving the optical disc in an inner portion of the apparatus;

a loading motor generating a driving force for driving the disc moving mechanism; and a transmission system structured such as to be provided with a gear and transmitting the driving force of the loading motor to the disc moving mechanism, wherein the transmission system is provided with a driven gear receiving the driving force from a gear in a previous stage, and a driving gear arranged so as to be coaxial with the driven gear and applying a driving force to a gear in the next stage, the driving gear is coupled in an inner diameter side of the driven gear so as to be movable in an axial direction and be rotatable integrally with the driven gear, the driving gear is structured such that the coupling with the driven gear is canceled in a state of being kept engaged with the gear in the next stage, by moving and displacing in an axial direction with respect to the driven gear.

Further, in accordance with the present invention, there is provided an optical disc apparatus capable of carrying out an emergency eject motion of an optical disc, comprising:

a disc moving mechanism moving the optical disc in an inner portion of the apparatus;

a loading motor generating a driving force for driving the disc moving mechanism; and a gear train forming a transmission system transmitting the driving force of the loading motor to the disc moving mechanism, wherein the gear train is structured such as to be provided with a plurality of gear units each having a driven gear receiving the driving force from a gear in a previous stage, and a driving gear arranged so as to be coaxial with the driven gear and applying a driving force to a gear in the next stage, wherein at least one of a plurality of gear units is structured such that a second gear corresponding to a driving gear is coupled in an inner diameter side of a first gear corresponding to a driven gear so as to be movable in an axial direction and be rotatable integrally with the driven gear, and the second gear is canceled the coupling with the first gear in a state of being engaged with the gear in the next gear, by moving and displacing in an axial direction with respect to the first gear, and wherein the coupling with the first gear is canceled by moving and displacing the second gear in the axial direction by an external force, at a time of an emergency eject, and the transmission system is set to a disconnection state so as to make the disc moving mechanism carry out a disc discharging motion and discharge the optical disc out of the apparatus.

Further, in accordance with the present invention, there is provided an optical disc apparatus capable of carrying out an emergency eject motion of an optical disc, comprising:

a disc moving mechanism moving the optical disc in an inner portion of the apparatus;

a loading motor generating a driving force for driving the disc moving mechanism;

a gear train arranged between the loading motor and the disc moving mechanism, and forming a transmission system transmitting the driving force of the loading motor to the disc moving mechanism;

a pressing member moving in the same direction as a direction in which an optical disc is pulled in so as to apply a pressing force in an axial direction to at least one gear in the gear train;

an arm member coupled to the pressing member at a rotation supporting point provided on the pressing member and having an arm portion extending to both sides of the rotation supporting point and being rotatable around the rotation supporting point;

a spring applying an elastic restoring force in a direction opposing to the movement to the pressing member; and a chassis to which the disc moving mechanism, the loading motor and the gear train are attached, wherein the gear train is structured such as to be provided with a plurality of gear units each having a driven gear receiving the driving force from a gear in a previous stage, and a driving gear arranged so as to be coaxial with the driven gear and applying a driving force to a gear in the next stage, at least one of a plurality of gear units is structured such that a second gear corresponding to a driving gear is coupled in an inner diameter side of a first gear corresponding to a driven gear so as to be movable in an axial direction and be rotatable integrally with the driven gear, and the second gear is canceled the coupling with the first gear in a state of being engaged with the gear in the next gear, by moving and displacing in an axial direction with respect to the first gear, wherein the arm member is structured such that when a pin for an emergency eject motion is inserted to the apparatus, one arm portion of the arm portions is pressed by a leading end of the pin, and the other arm portion rotates around the rotation supporting point while moving in the same direction as a direction in which an optical disc is pulled in against an elastic restoring force of the spring while keeping a state in which the other arm portion comes into contact with an inner surface side of the chassis, and stops moving and rotating at a time when the leading end of the pin is detached from the one arm portion, wherein the pressing member is structured such as to move in the same direction as the direction in which the optical disc is pulled in against the elastic restoring force of the spring on the basis of the movement of the arm member, apply a pressing force in the axial direction to the second gear of the one gear unit so as to move and displace the second gear in the axial direction on the basis of the movement, and cancel the coupling with the first gear, and wherein in the case that the coupling of the second gear with the first gear is canceled, and the transmission system is set to a disconnection state, the pin further moves so as to make the disc moving mechanism carry out a disc discharging motion and discharge the optical disc out of the apparatus.

Further, in the optical disc apparatus in accordance with the present invention, it is preferable that the first gear has a plurality of first protruding portions protruding to an inner side in a radial direction in a portion close to an inner diameter coupled to the second gear, the second gear has a plurality of second protruding portions protruding to an outer side in the radial direction and having a smaller width in a peripheral direction than an interval in the peripheral direction between the first protruding portions, the coupling between the first and second gears is canceled in the case that the second gear moves and displaces in the axial direction and the second protruding portion does not lap over the first protruding portion in the axial direction, whereby the transmission system by the gear train is set to a disconnected state.

Further, in the optical disc apparatus in accordance with the present invention, it is preferable that the first gear is structured such as to be engaged with a gear coupled to an axis of rotation of the loading motor.

Further, in the optical disc apparatus in accordance with the present invention, it is preferable that the second gear is structured such as to be provided with a pressed portion having an inclined surface formed in a whole periphery, at a position pushed by the pressing member.

Further, in the optical disc apparatus in accordance with the present invention, it is preferable that the one gear unit is provided with a spring between the first gear and the second gear, and is structured such that the second gear is pushed in the axial direction by an elastic restoring force of the spring.

Further, in the optical disc apparatus in accordance with the present invention, it is preferable that the arm member is structured such that in the case of stopping the movement and the rotation, the one arm portion comes into contact with a side surface of the pin, the other arm portion comes into contact with an inner surface side of the chassis, and the rotation supporting point exists between the both contact positions.

EFFECT OF THE INVENTION

In accordance with the present invention, in the optical disc apparatus, it is possible to carry out the emergency eject motion without canceling the engagement between the gears having different axes in the gear train between the loading motor and the disc moving mechanism. As a result, it is possible to prevent the teeth from being damaged or deteriorated due to the attaching and detaching motions between the teeth between the gears, and it is possible to secure a reliability as the optical disc apparatus. Further, the mechanism for regulating the axial position of the gear and the mechanism for guiding the axial movement are not necessary, and it is easy to achieve a downsizing and a thin structure of the gear train.

Other objects, features and advantages of the invention will become apparent from the following description of the embodiments of the invention taken in conjunction with the accompanying drawings.

DETAILED DESCRIPTION OF THE INVENTION

A description will be given of an embodiment in accordance with the present invention with reference to the accompanying drawings.

Figure 1:
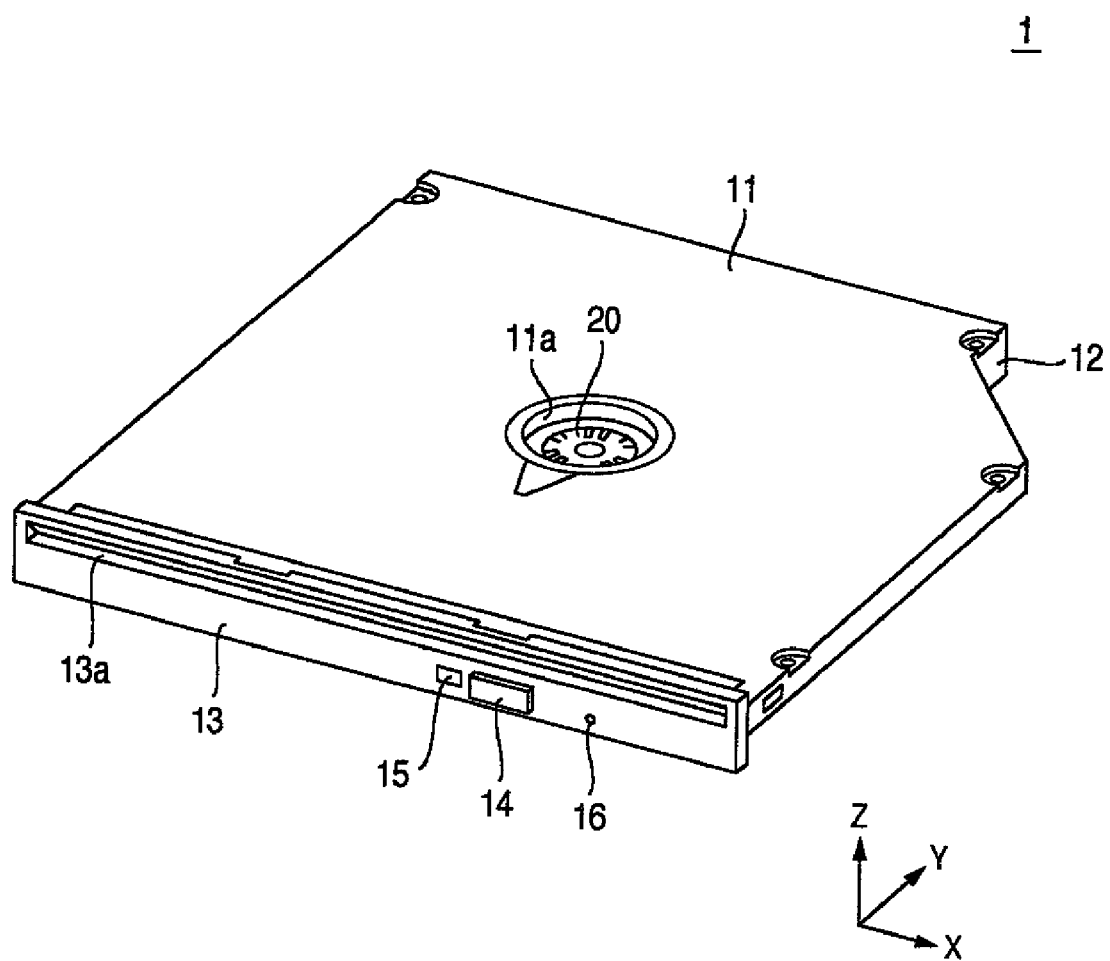
FIG. 1 is a view of an outer appearance of an optical disc apparatus as an embodiment in accordance with the present invention.
Figure 2:
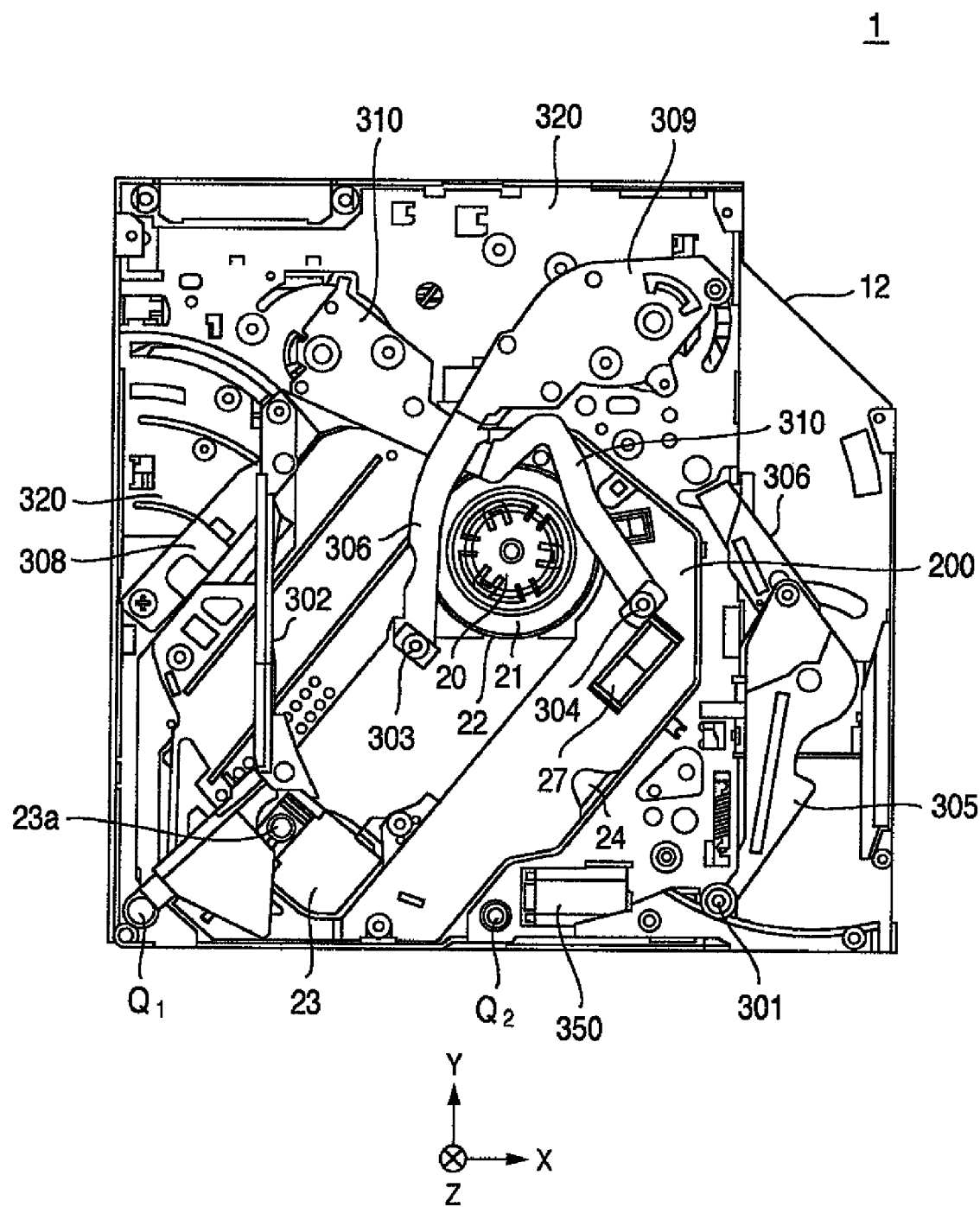
FIG. 2 is a view showing a structure in the case that a top cover is detached in the optical disc apparatus in FIG. 1.
Figure 3:
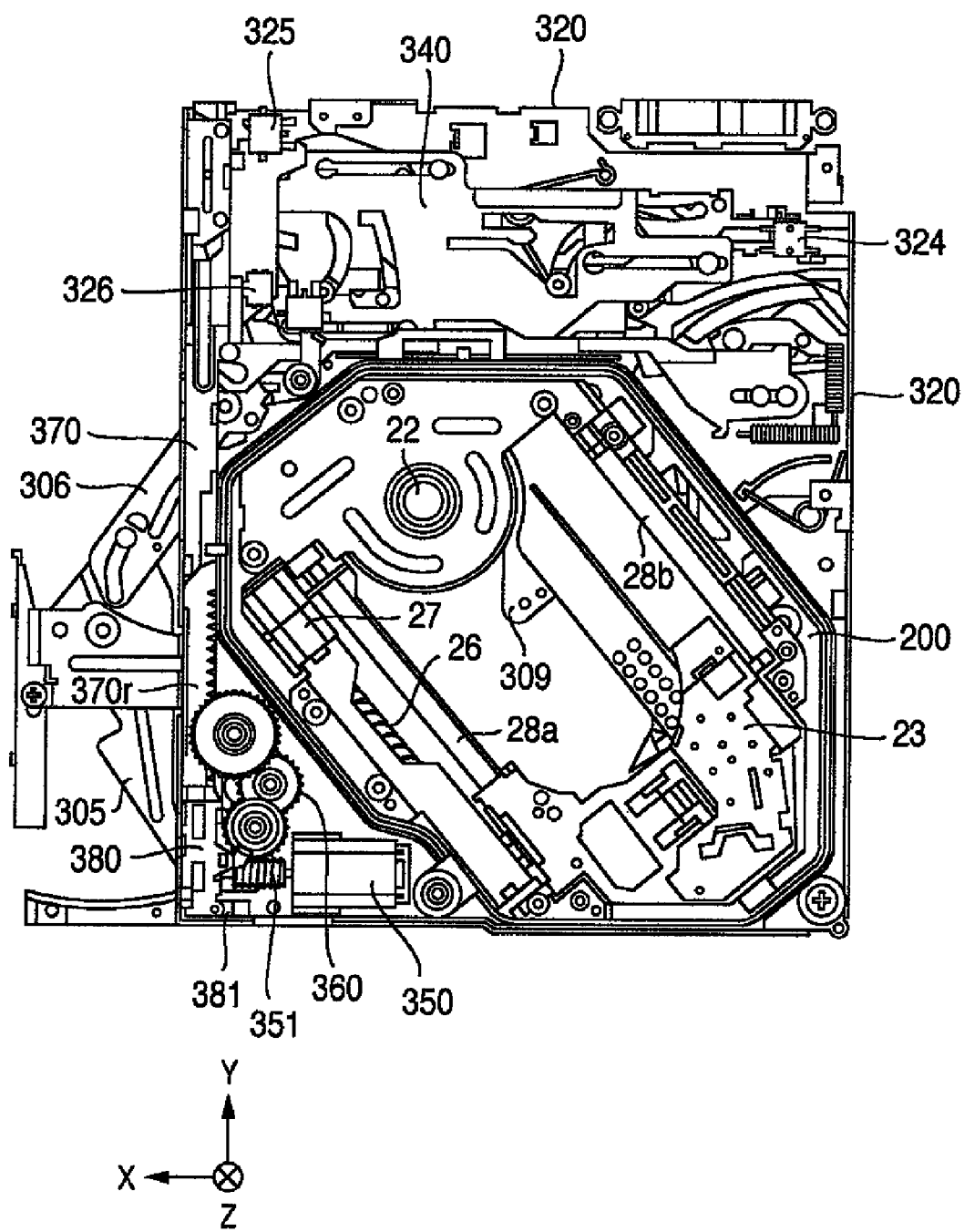
FIG. 3 is a view showing a structure in the case that a bottom case is detached in the optical disc apparatus in FIG. 1.
Figure 4:
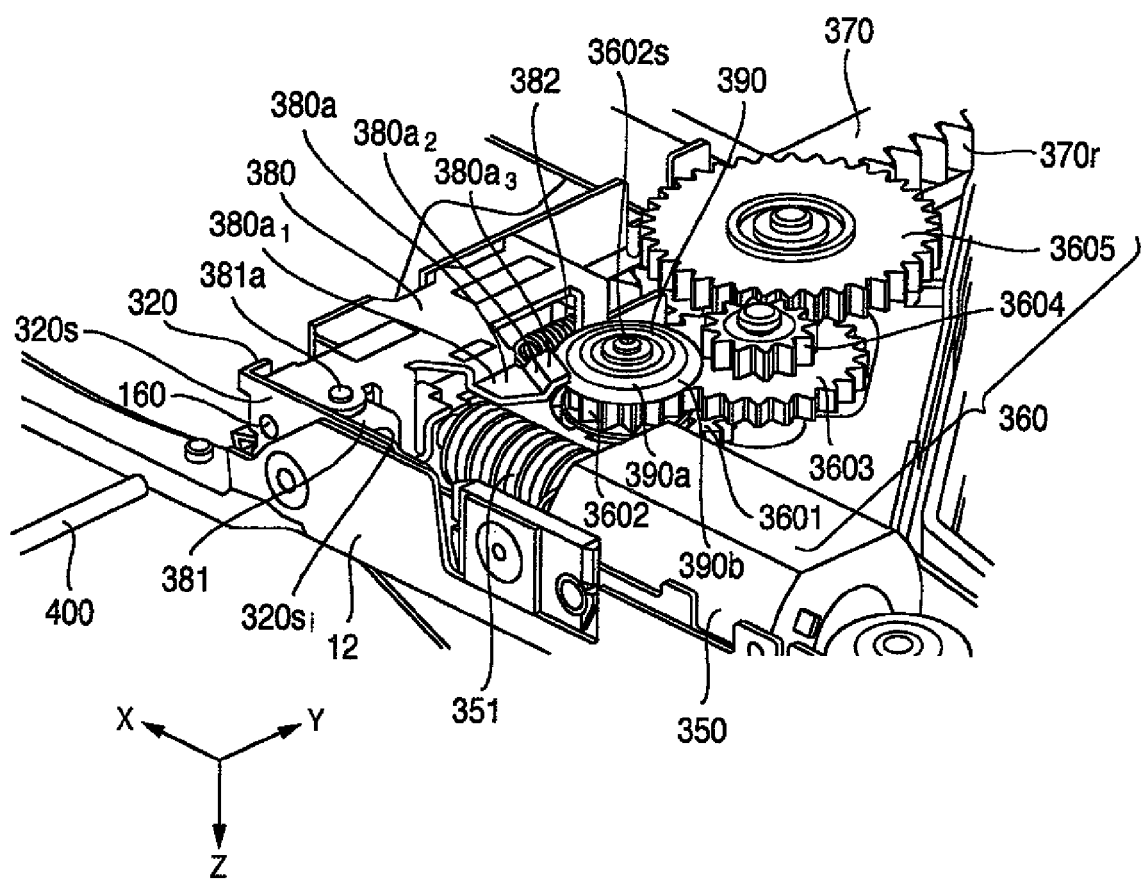
FIG. 4 is a perspective view showing a structure of an emergency eject mechanism in the optical disc apparatus in FIG. 1, and is a view showing a state before an emergency eject motion.
Figure 5:
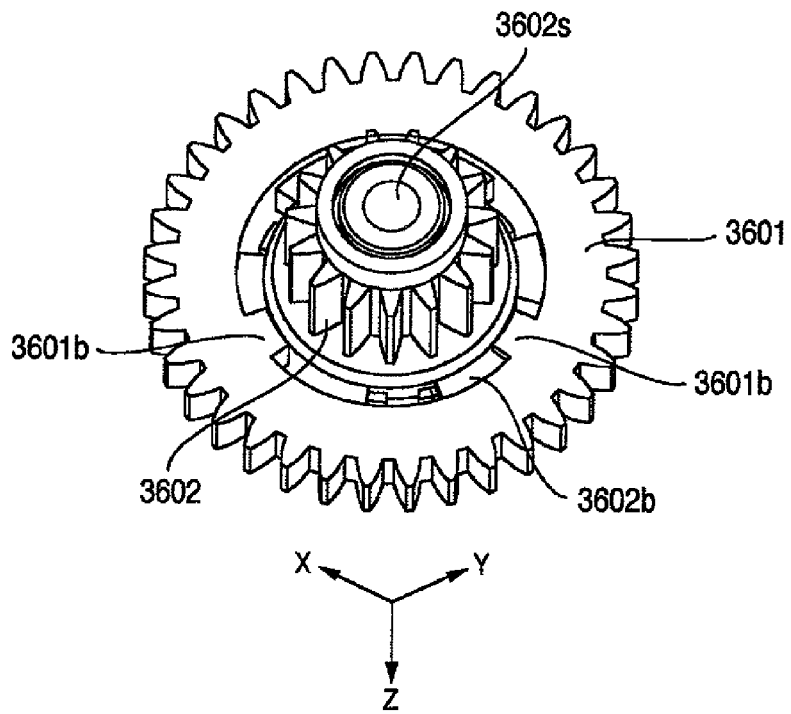
FIG. 5 is a perspective view of a gear unit constructing the emergency eject mechanism in FIG. 4.
Figure 6:
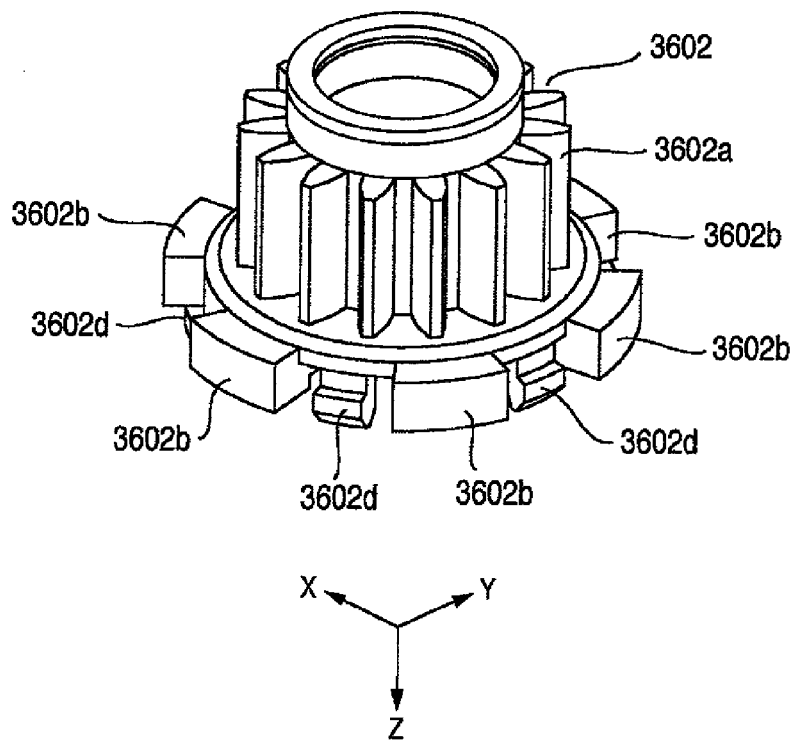
FIG. 6 is a perspective view of a driving gear constructing the gear unit in FIG. 5.
Figure 7:
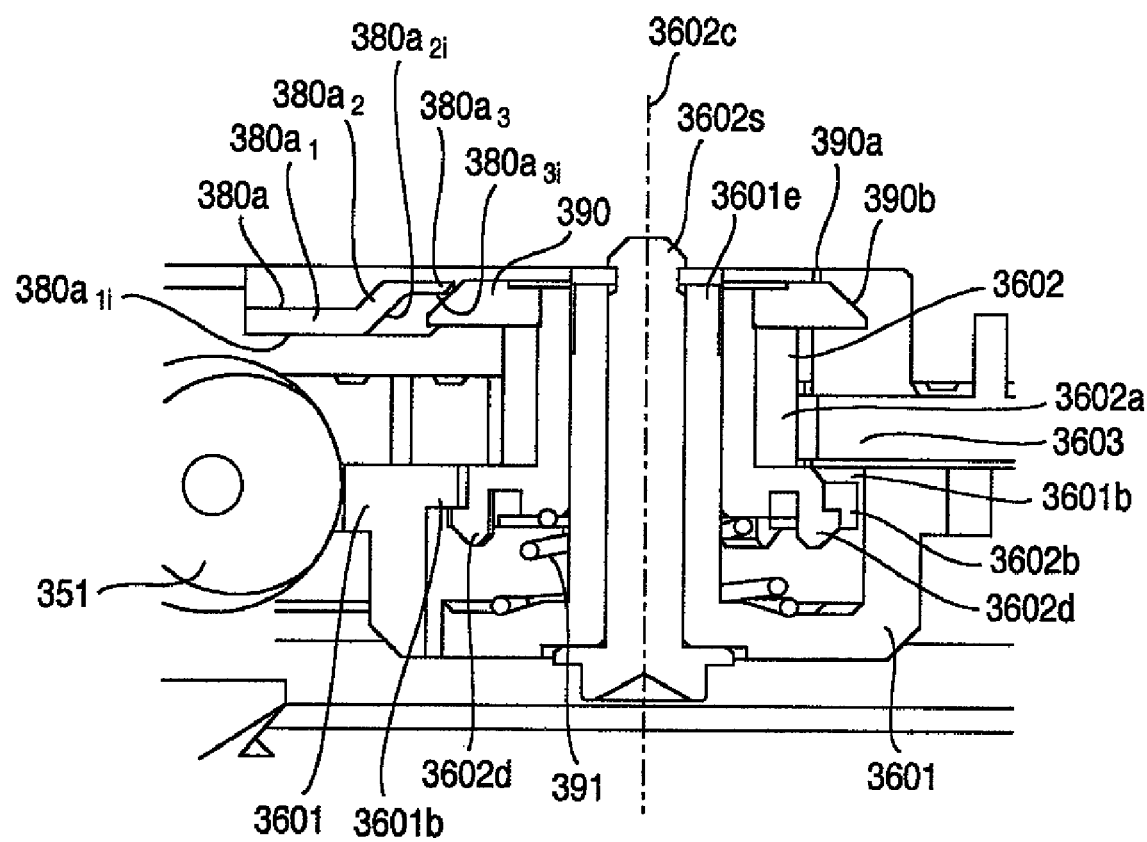
FIG. 7 is a cross sectional view in an axial direction of the gear unit in FIG. 4, and is a view showing a structure in a state in which a driven gear and the driving gear are coupled.
Figure 8:
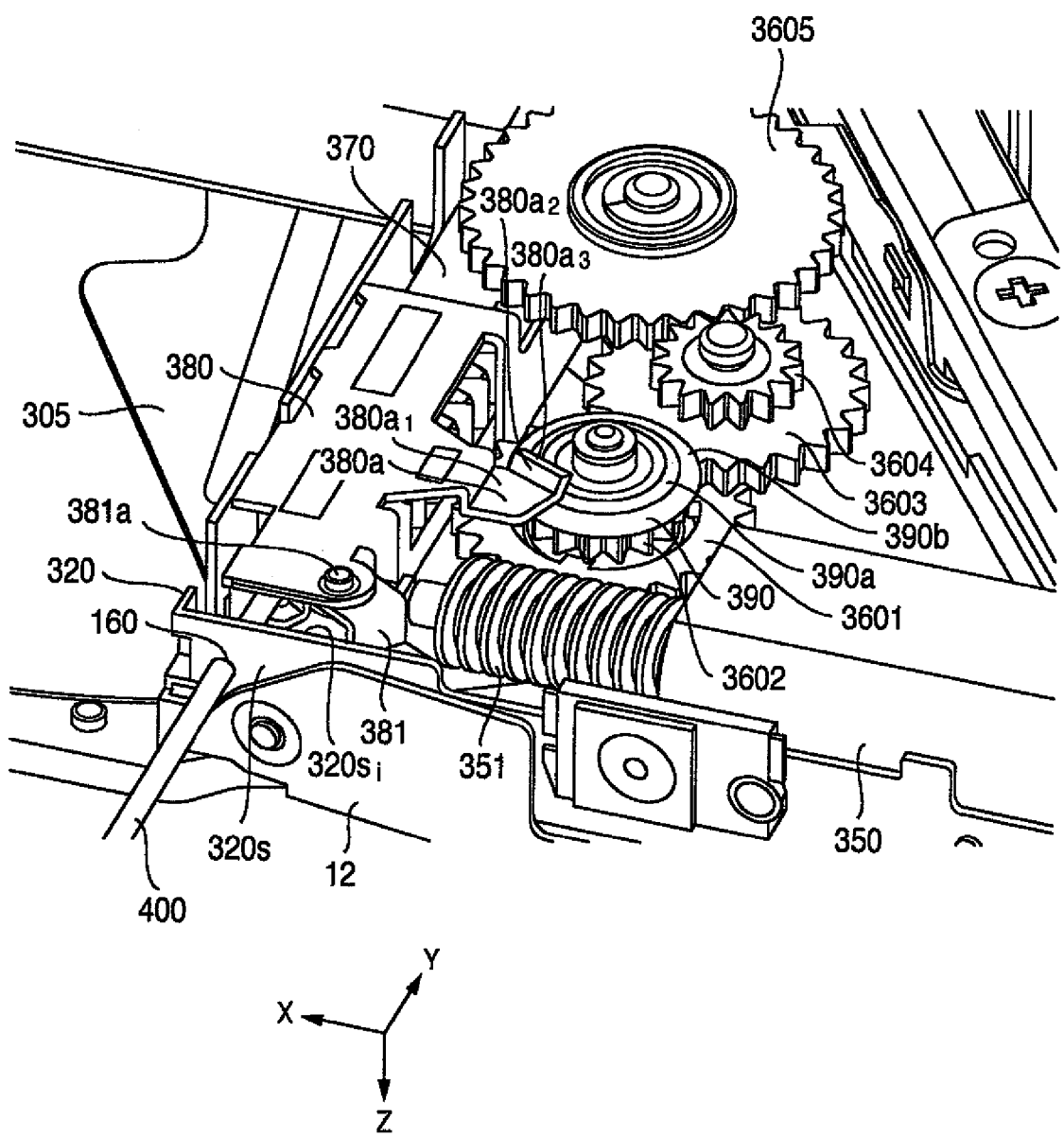
FIG. 8 is a perspective view showing a structure of the emergency eject mechanism in the optical disc apparatus in FIG. 1, and a view showing a state during the emergency eject motion.
Figure 9:
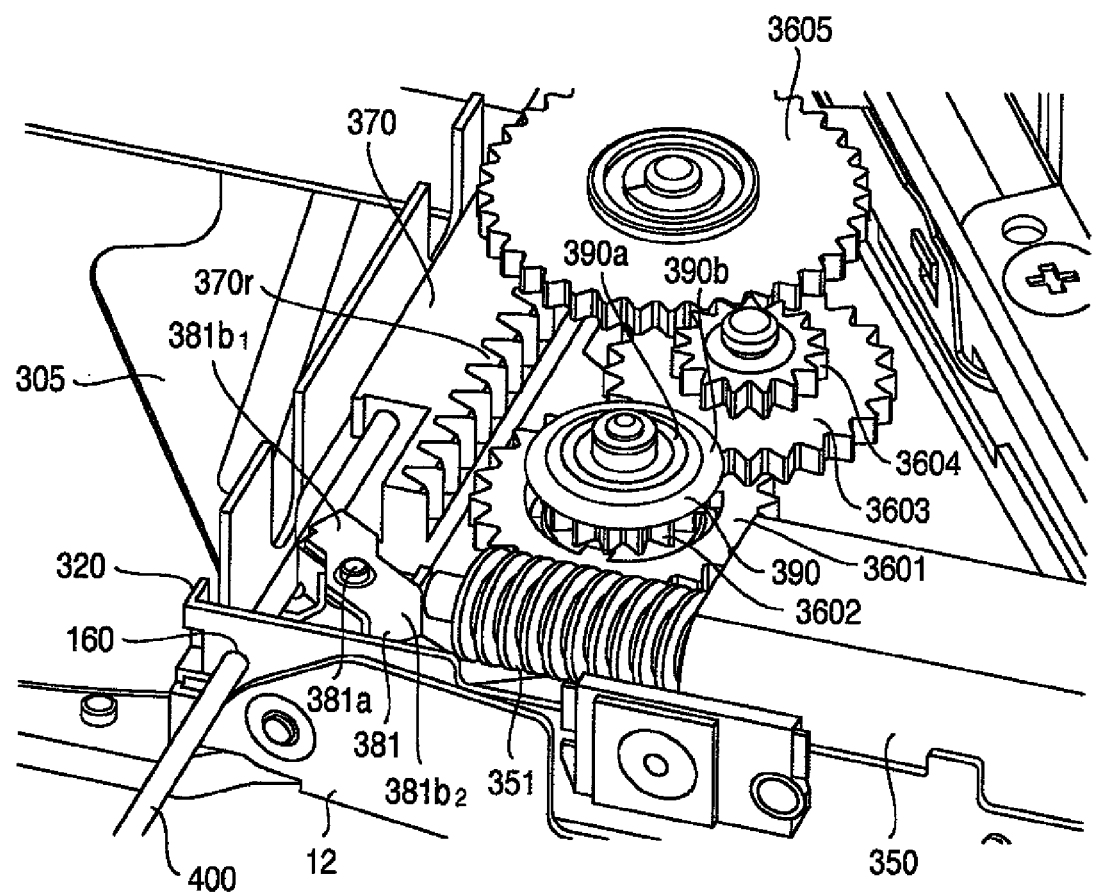
FIG. 9 is a view showing a state in which a pressing member is removed in the structure in FIG. 8.
Figure 10:
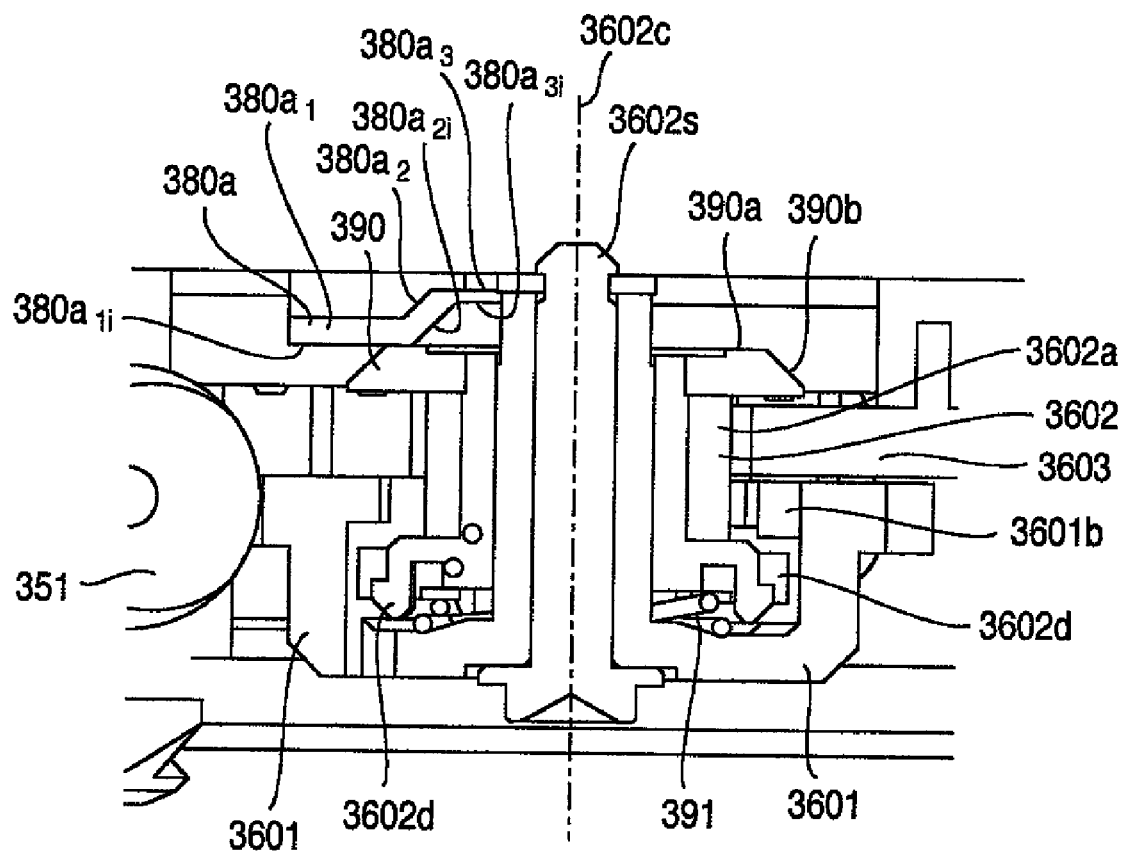
FIG. 10 is a cross sectional view in an axial direction of the gear unit in FIG. 4, and is a view showing a structure in a state of FIG. 8.
Figure 11:
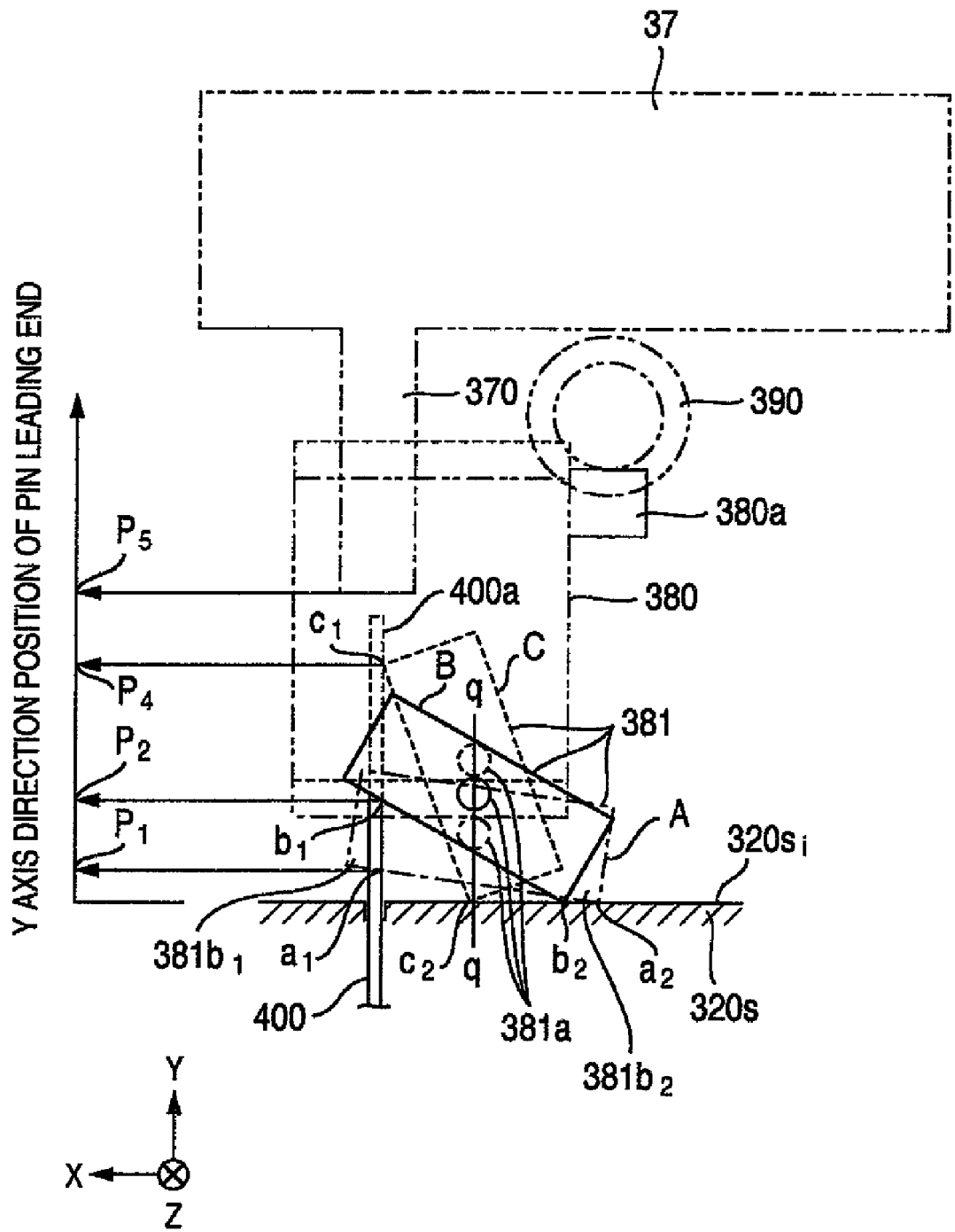
FIG. 11 is a view explaining a motion of an arm member of the emergency eject mechanism in the optical disc apparatus in FIG. 1.
Figure 12:
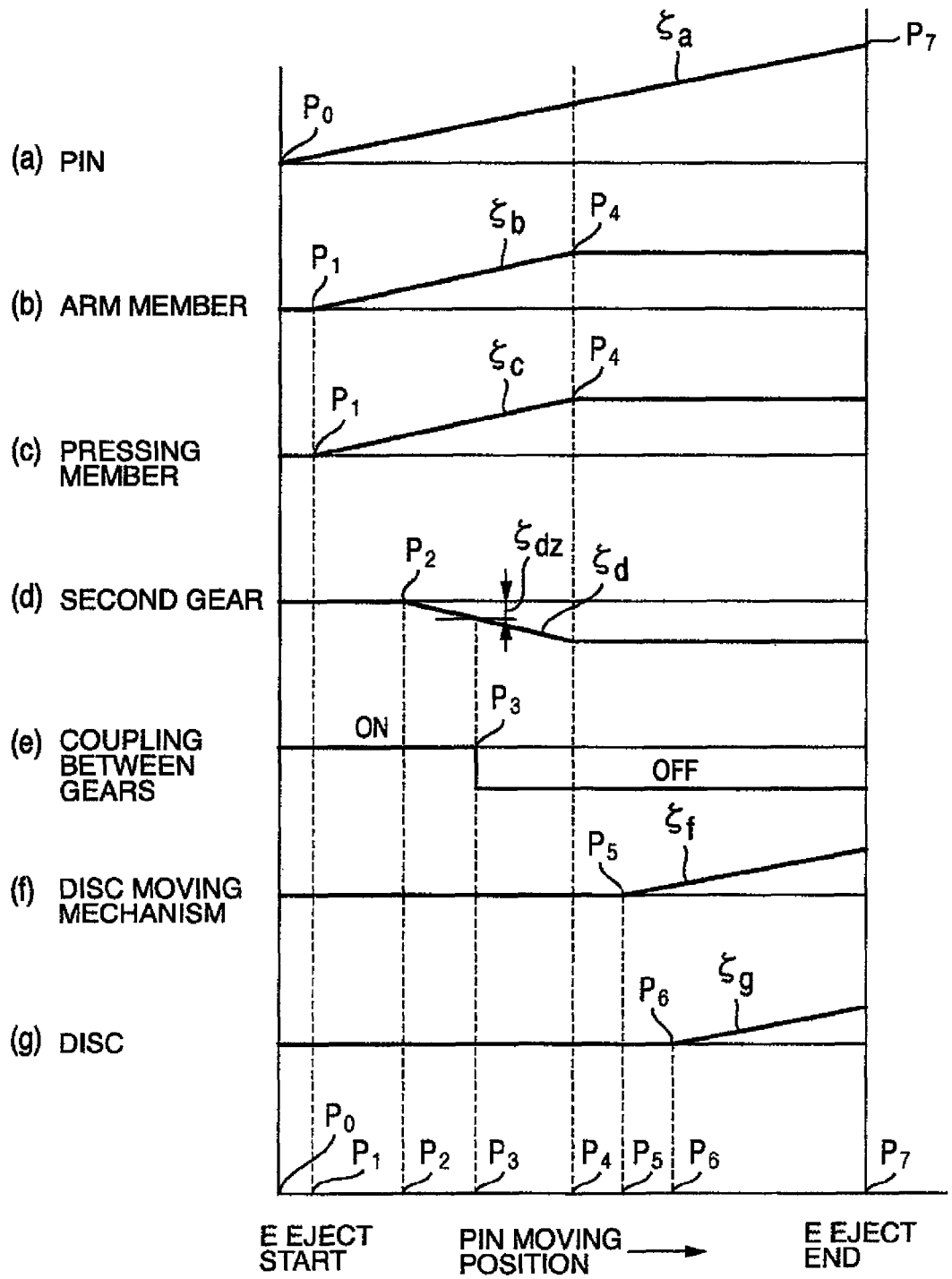
FIG. 12 is a view showing a displacing state of each of portions in the emergency eject motion of the emergency eject mechanism in the optical disc apparatus in FIG. 1.

FIGS. 1 to 12 are explanatory views of an optical disc apparatus as an embodiment in accordance with the present invention. FIG. 1 is a view of an outer appearance of an optical disc apparatus as an embodiment in accordance with the present invention, FIG. 2 is a view showing a structure in the case that a top cover is detached in the optical disc apparatus in FIG. 1, FIG. 3 is a view showing a structure in the case that a bottom case is detached in the optical disc apparatus in FIG. 1, FIG. 4 is a perspective view showing a structure of an emergency eject mechanism in the optical disc apparatus in FIG. 1, and is a view showing a state before an emergency eject motion, FIG. 5 is a perspective view of a gear unit constructing the emergency eject mechanism in FIG. 4, FIG. 6 is a perspective view of a driving gear constructing the gear unit in FIG. 5, FIG. 7 is a cross sectional view in an axial direction of the gear unit in FIG. 4, and is a view showing a structure in a state in which a driven gear and the driving gear are coupled, FIG. 8 is a perspective view showing a structure of the emergency eject mechanism in the optical disc apparatus in FIG. 1, and a view showing a state during the emergency eject motion, FIG. 9 is a view showing a state in which a pressing member is removed in the structure in FIG. 8, FIG. 10 is a cross sectional view in an axial direction of the gear unit in FIG. 4, and is a view showing a structure in a state of FIG. 8, FIG. 11 is a view explaining a motion of an arm member of the emergency eject mechanism in the optical disc apparatus in FIG. 1, and FIG. 12 is a view showing a displacing state of each of portions in the emergency eject motion of the emergency eject mechanism in the optical disc apparatus in FIG. 1.

In FIG. 1, reference numeral 1 denotes a thin slot-in type optical disc apparatus corresponding to an embodiment in accordance with the present invention, reference numeral 11 denotes a top cover covering a top face side (a Z-axis direction side) of the apparatus in the optical disc apparatus 1, reference symbol 11a denotes a hole provided within a flat surface of the top cover 11, reference numeral 12 denotes a bottom case covering a bottom face side (a −Z-axis direction side) of the apparatus, reference numeral 13 denotes a front panel in a front face of the apparatus, reference symbol 13a denotes an opening of the front panel 13 for inserting an optical disc (not shown) into the apparatus (inserting in a Y-axis direction) or picking up from the apparatus, reference numeral 14 denotes an eject button, reference numeral 15 denotes an LED displaying an operating state of the apparatus, reference numeral 16 denotes a pin insertion hole for inserting a pin (not shown) for an emergency eject at a time of making the optical disc apparatus 1 carry out an emergency eject motion, and reference numeral 20 denotes a damper inserted into a center hole of the optical disc and supporting the optical disc in a radial direction thereof so as to chuck. The optical disc can be applied the emergency eject motion from a state in which the optical disc is chucked by the damper 20, that is, in a state in which the damper 20 is inserted into the center hole of the optical disc, within the optical disc apparatus 1, and is discharged from the opening 13a of the front panel 13 on the basis of the emergency eject.

In the following description, the same reference numerals as those of FIG. 1 are attached to the constructing elements in the optical disc apparatus in FIG. 1 used for explaining.

FIG. 2 is a plan view showing a structure of a top face side (an optical disc loading side) of the optical disc apparatus 1 at a time when the top cover 11 is detached, and FIG. 3 is a plan view showing a structure of a bottom face side of the optical disc apparatus 1 at a time when the bottom case is detached.

In FIG. 2, reference numeral 22 denotes a spindle motor rotationally driving the optical disc (not shown), reference numeral 20 denotes a damper concentrically fixed on a rotating portion of the spindle motor 22, reference numeral 21 denotes a turn table concentrically arranged in a periphery of the damper 20 on the rotating portion of the spindle motor 22, and supporting a flat surface portion (a flat surface portion in a recorded or reproduced side) around the center hole of the optical disc in a state in which the damper 20 is inserted into the center hole of the optical disc, reference numeral 23 denotes an optical pickup moving approximately in a radial direction of the optical disc at a time of recording or reproducing, and irradiating a laser beam on the optical disc surface, reference symbol 23a denotes an objective lens, reference numeral 24 denotes a mechanical deck member to which a moving and guiding mechanism portion (not shown) moving the optical disc approximately in the radial direction and the like are fixed, and reference numeral 200 denotes a traverse unit structured such as to be provided with the mechanical deck member 24, the damper 20, the turn table 21, the spindle motor 22, the optical pickup 23, the moving and guiding mechanism portion and the like. The traverse unit 200 rotates and displaces with respect to a reference surface within the optical disc apparatus 1 by setting positions of points Q1 and Q2 to supporting point positions, displacing upward the clamper 20 in the Z-axis direction so as to chuck the optical disc, and displacing downward the damper 20 in the −Z-axis direction after chucking so as to set the optical disc to a rotatable state for recording or reproducing.

Further, FIG. 2, reference numeral 320 denotes a chassis constructing an apparatus basement, reference numeral 350 denotes a loading motor fixed to the chassis 320, reference numeral 301 denotes an insert roller coming into contact with an outer periphery of the optical disc inserted from the opening 13a of the front panel 13, reference numeral 305 denotes an insert arm to which the insert roller 301 is rotatably attached, attached so as to be rotatable around a supporting point on the chassis 320, and pulling the optical disc further into the apparatus together with the insert roller 301, that is, moving in a Y-axis direction so as to load, reference numeral 302 denotes a guide member coming into contact with the outer periphery of the optical disc and supporting the optical disc by a guide surface at a time when the optical disc moves within the apparatus, reference numeral 308 denotes a rotary link to which the guide member 302 is coupled so as to freely swing, and being rotatable around the supporting point on the chassis 320, reference numeral 303 denotes an eject roller supporting the disc outer periphery at a time of loading the optical disc, and pressing the outer periphery of the optical disc at an unloading time (an eject time) and an emergency eject time, reference numeral 309 denotes an eject arm to which the eject roller 303 is rotatably attached, attached so as to be rotatable around the supporting point on the chassis 320, and moving the optical disc in a −Y-axis direction together with the eject roller 303 at the unloading time (the eject time) and the emergency eject time so as to unload (eject) or emergency eject, reference numeral 304 denotes a disc roller coming into contact with the outer periphery of the optical disc so as to support the optical disc at a time of loading and unloading the optical disc, reference numeral 310 denotes a disc lever to which the disc roller 304 is rotatably attached, attached so as to be rotatable around the supporting point on the chassis 320, and supporting the optical disc together with the disc roller 304 at a time of loading and unloading the optical disc, and reference numeral 306 denotes an action lever coupled to the insert arm 305, having a structure which is rotatable around the supporting point, and rotationally displacing on the basis of a driving force of the loading motor 350 at a time of loading the optical disc so as to rotationally displace the insert arm 305.

Further, in FIG. 3, reference numeral 26 denotes a lead screw member provided with a screw on its front surface and moving the optical pickup 23 approximately in the radial direction of the optical disc on the basis of the rotation of the screw, reference numeral 27 denotes a slide motor rotationally driving the lead screw member 26, reference symbols 28a and 28b denote a guide member guiding the movement of the optical pickup 23, reference numeral 351 denotes a worm gear fixed to an output shaft of the loading motor 350, reference numeral 360 denotes a gear train in which a plurality of (three) gear units are arranged, each having a driven gear receiving a driving force from the gear in the previous stage and a driving gear applying the driving force to the gear in the next stage on the same axis, reference numeral 370 denotes a function lever driven by the gear train 360, reference symbol 370r denotes a rack portion on the function lever 370, the rack portion to which the driving force is transmitted from the gear unit in the final stage of the great train 360, reference numeral 324 denotes a loading switch turning on the loading motor 350, reference numeral 325 denotes an eject switch detecting a fact that the function lever 370 moves to the eject position, reference numeral 326 denotes a mechanical mode switch detecting a fact that the optical disc apparatus 1 moves to an initial state (a disc insertion standby state) and a position which can carry out a recording or reproducing motion, reference numeral 380 denotes a pressing member pressing a driving gear (a second gear) within one gear unit in the gear train 360 so as to displace in an axial direction, on the basis of a moving displacement in the Y-axis direction, reference numeral 381 denotes an arm member rotatably attached to the pressing member 380 and regulating the moving motion of the pressing member 380, and reference numeral 340 denotes a cam slider provided with a cam groove and being capable of moving and displacing in +X-axis directions on the basis of the moving displacement of the function lever 370.

In the structure mentioned above, the function lever 370, the cam slider 340, the insert roller 301, the insert arm 305, the action lever 306, the eject roller 303, the eject arm 309, the disc roller 304, the disc lever 310, the guide member 302 and the rotary link 308 construct a disc moving mechanism pulling (loading) the optical disc into the apparatus or discharging (unloading (ejecting) or emergency ejecting) the optical disc from the apparatus toward an external portion. Further, the lead screw member 26, the slide motor 27 and the guide members 28a and 28b construct a moving and guiding mechanism portion moving and guiding the optical pickup 23 approximately in a radial direction of the optical disc. Further, the gear train 360, the pressing member 380 and the arm member 381 construct an emergency eject mechanism driving the disc moving mechanism at a time of the emergency eject.

The disc moving mechanism is driven on the basis of the driving force of the loading motor 350 at the loading time and the unloading time (at the ejecting time), and is driven on the basis of an external force by a manual operation, that is, a pressing force by a pin (not shown) inserted into the apparatus from the pin insertion hole 16 of the front panel 13, at a time of the emergency eject.

If the eject button 14 is pushed at the unloading time (at the ejecting time), an electric signal is input to a control circuit (not shown) within the optical disc apparatus 1, a motor driving circuit (not shown) within the optical disc apparatus 1 is controlled by the control circuit, the rotation of the spindle motor 22 is stopped, and the loading motor 350 is thereafter rotationally driven in a reverse direction to the case of the loading motion. The disc moving mechanism is activated on the basis of the driving force of the loading motor 350. In other words, the driving force of the loading motor 350 moves and displaces the function lever 370 in the Y-axis direction. On the basis of the movement and displacement of the function lever 370 in the Y-axis direction, the mechanical parts including the cam slider 340 are activated in a reverse direction to the loading time. If the function lever 370 moves and displaces in the Y-axis direction so as to reach the eject position, the eject switch 325 detects this (the fact that the function lever 370 moves to the eject position), the detection signal is input to the control circuit, the motor driving circuit is controlled by the control circuit, and the rotation of the loading motor 350 is stopped. Further, when the function lever 370 moves and displaces in the Y-axis direction so as to reach the eject position, the eject arm 309 is rotated in a disc discharging direction around the supporting point on the basis of the movement and displacement of the function lever 370. The eject roller 303 pushes the optical disc 2 in the −Y-axis direction on the basis of the rotation of the eject arm 309. Accordingly, the optical disc 2 is discharged from the optical disc apparatus 1.

At a time of the emergency eject, the spindle motor 22 and the loading motor 350 are set to an off state by being disconnected an electrical input. In the electrical input off state, the disc moving mechanism is activated on the basis of the pressing force by the movement of the pin (not shown) inserted into the apparatus from the pin insertion hole 16 of the front panel 13. In other words, when the function lever 370 moves and displaces in the Y-axis direction together with the movement of the pin, and the function lever 370 reaches the eject position, the eject arm 309 is rotated in the disc discharging direction around the supporting point on the basis of the movement and displacement of the function lever 370. The eject roller 303 pushes the optical disc 2 in the −Y-axis direction on the basis of the rotation of the eject arm 309, and the optical disc 2 is discharged from the optical disc apparatus 1.

At a time of the emergency eject, the transmission system in the gear train 360 is set to a disconnected state (an off state), and the disc moving mechanism is prevented from being a load of the loading motor 350. In other words, in view of the function lever 370 side, the loading motor 350 is set to a mechanically disconnected state. In the optical disc apparatus 1, within a first stage gear unit engaged with the worm gear 351, in three gear units constructing the gear train 360, with respect to a large diameter driven gear (a first gear) receiving the driving force from the worm gear 351, a small diameter driving gear (a second gear) arranged coaxially with the driven gear and applying a driving force to a driven gear in the next stage gear unit is structured such as to be movable in the axial direction and be rotatable integrally with the driven gear, and a coupled state in which the driving gear can rotated integrally with the driven gear (the first gear) is disconnected by moving the driving gear (the second gear) in the axial direction at a time of the emergency eject, whereby the driving gear (the second gear) can rotate independently from the driven gear (the first gear).

In the following description, the same reference numerals as those in the case of FIGS. 2 and 3 are attached to the constructing elements in the structure described in FIGS. 2 and 3 used in the description.

FIG. 4 is a perspective view showing a structure of the emergency eject mechanism in the optical disc apparatus in FIG. 1, and is a view showing a structure in a state before carrying out the emergency eject motion.

In FIG. 4, reference numeral 3601 denotes a large diameter driven gear within the first stage gear unit, reference numeral 3602 denotes a small diameter driving gear within the first stage gear unit, reference numeral 3603 denotes a large diameter driven gear within the second stage gear unit, reference numeral 3604 denotes a small diameter driving gear within the second stage gear unit, and reference numeral 3605 denotes a large diameter driven gear within the third stage gear unit. The small diameter driving gear within the third stage gear unit is not illustrated in FIG. 4. The driven gear 3601 and the driving gear 3602 are arranged coaxially within the first stage gear unit, the driven gear 3603 and the driving gear 3604 are arranged coaxially within the second gear unit, and the driven gear 3605 and the driving gear are arranged coaxially within the third stage gear unit. The first stage gear unit, the second stage gear unit and the third stage gear unit are coupled, the driven gear 3601 is engaged with the worm gear 351, and receives the driving force from the worm gear 351 so as to rotate, the driven gear 3603 is engaged with the driving gear 3602, and receives the driving force from the driving gear 3602 so as to rotate, and the driven gear 3605 is engaged with the driving gear 3604 and receives the driving force from the driving gear 3604 so as to rotate. The driving gear (not shown) within the third stage gear unit is engaged with a rack portion 370r of the function lever 370. Within the first stage gear unit, the driven gear 3601 serving as the first gear and the driving gear 3602 serving as the second gear are coupled to the driven gear 3601 in a coupling portion provided in an inner diameter (closer to a center axis than a portion in which the teeth are formed) side of the driven gear 3601 in a state of being movable in the axial direction and being integrally rotatable with the driven gear, and the driving gear 3602 is canceled the coupling in the coupling portion so as to be rotatable, with respect to the driven gear 3601, while keeping the engagement with the driven gear 3603 of the second stage gear unit, by moving and displacing in the axial direction, at a time of the emergency eject.

Further, in FIG. 4, reference symbol 3602s denotes a shaft of the first stage gear unit, that is, an axis which is in common between the driven gear (the first gear) 3601 and the driving gear (the second gear) 3602, reference numeral 390 denotes a pressed portion provided in an upper portion in a −Z-axis direction of the driving gear (the second gear) 3602 and in which an inclined surface is formed over a whole periphery, reference symbol 390a denotes a front surface portion (hereinafter, refer to as a flat surface portion) which is formed in a closer side to the shaft 3602s and is vertical to the shaft 3602s, in the front surface of the pressed portion 390, reference symbol 390b denotes an inclined surface portion in which an inclined surface is formed, in the front surface of the member 390, reference symbol 380a1 denotes a first portion of a pressing portion 380a of the pressing member 380, reference symbol 380a2 denotes a second portion in the same manner, and reference symbol 380a3 denotes a third portion in the same manner. Both the first portion 380a1 and the third portion 380a3 of the pressing portion 380a of the pressing member 380 are structured such that the surfaces in the Z-axis direction are approximately vertical to the shaft 3602s, and the second portion 380a2 is formed as a surface which is inclined to the shaft 3602s. Further, reference symbol 381a denotes a rotation supporting point of the arm member 381 provided on the pressing member 380, reference numeral 160 denotes a pin insertion hole provided at a position coinciding with the pin insertion hole 16 of the front panel 13, on the chassis 320, reference numeral 382 denotes a tension coil spring connected between the pressing member 380 and the chassis 320 and applying an elastic restoring force in the −Y-axis direction to the pressing member 380, reference symbol 320s denotes a side wall in the −Z-axis direction of the chassis 320, reference symbol 320si denotes an inner surface of the side wall 320s, and reference numeral 400 denotes a pin inserted from the pin insertion holes 16 and 160 at a time of the emergency eject.

In the structure in FIG. 4, for the emergency eject, the pin 400 is inserted from the pin insertion hole 160, and pushes the arm portion (one arm portion) existing closer to the X-axis direction than the rotation supporting point 381a provided on the pressing member 380 of the arm member 381, in the Y-axis direction, at a time of moving in the Y-axis direction. By being pushed, the arm member 381 rotates in a clockwise direction around the rotation supporting point 381a while moving and displacing in the Y-axis direction against the elastic restoring force of the tension coil spring 382. At this time, in a state in which the arm portion (the other arm portion) existing closer to the −X-axis direction than the rotation supporting point 381a of the arm member 381 comes into contact with the inner surface 320si of the side wall 320s in the −Z-axis direction of the chassis 320, the contact portion slides on the surface close to the inner surface 320*si* so as to move in the X-axis direction. Since the arm member 381 moves in the Y-axis direction, the pressing member 380 moves in the Y-axis direction, and the pressing portion 380*a* pushes the pressed portion 390 within the first stage gear unit in the order of the inclined surface portion 390*b* and the flat surface portion 390*a*, and moves and displaces the driving gear (the second gear) 3602 in the Z-axis direction together with the pressed portion 390. On the basis of the movement of the driving gear (the second gear) 3602, the driving gear 3602 is canceled the coupling which is integrally rotatable with the driven gear 3601 in the coupling portion in the inner diameter side of the driven gear 3601. The transmission system in the gear train 360 is set to a disconnected state (an off state) by canceling the coupling. Further, at this time, the driving gear 3602 moves and displaces in the Z-axis direction while keeping the state in which the driving gear 3602 is engaged with the driven gear 3603 of the second stage gear unit.

In the following description, the same reference numerals as those in the case of FIG. 4 are attached to the constructing elements of the structure in FIG. 4 used in the following description.

FIG. 5 is a perspective view of a first stage gear unit constructing the emergency eject mechanism in FIG. 4.

In FIG. 5, reference symbol 3601*b* denotes a plurality of first protruding portions constructing a coupling portion in an inner diameter side of the driven gear (the first gear) 3601, and reference symbol 3602*b* denotes a plurality of second protruding portions constructing the coupling portion together with the first protruding portions 3601*b* of the driven gear 3601, on the driving gear (the second gear) 3602. The first protruding portion 3601*b* is structured such as to be protruded to an inner side in a radial direction in an inner diameter side portion of the driven gear 3601, and the second protruding portion 3602*b* is structured such as to be protruded to an outer side in the radial direction on the driving gear 3602 and make a width in a peripheral direction somewhat smaller than an interval in a peripheral direction between the first protruding portions 3601*b*.

In the following description, the same reference numerals as those of the case in FIG. 5 are attached to the constructing elements of the structure in FIG. 5 used in the following description.

FIG. 6 is a perspective view of the driving gear 3602 constructing the first stage gear unit in FIG. 5.

In FIG. 6, reference symbol 3602*a* denotes a tooth of the driving gear 3602, and reference symbol 3602*d* denotes a height position holding protruding portion for holding a height position in the −Z-axis direction of the driving gear 3602, in a state in which the second protruding portion 3602*b* in the driving gear 3602 is coupled to the first protruding portion 3601*b* of the driven gear 3601. The height position holding protruding portion 3602*d* holds the height position in the −Z-axis direction of the driving gear 3602 by engaging with a lower surface (a surface in the Z-axis direction) of the first protruding portion 3601*b* of the driven gear 3601.

In the following description, the same reference numerals as those of the case in FIG. 6 are attached to the constructing elements of the structure in FIG. 6 used in the following description.

FIG. 7 is a cross sectional view in an axial direction of the first stage gear unit in the gear units in FIG. 4, and is a view showing a structure in which the driven gear 3601 and the driving gear 3602 are coupled in the coupling portion in a state in which they are integrally rotatable.

In FIG. 7, reference numeral 391 denotes a compression coil spring arranged between the driven gear 3601 and the driving gear 3602 and generating an elastic restoring force in the −Z-axis direction, reference symbol 380*ali* denotes a surface closer to the Z-axis direction in the first portion 380*a*1 of the pressing portion 380*a* of the pressing member 380, reference symbol 380*a*2*i* denotes a surface closer to the Z-axis direction in the inclined second portion 380*a*2 of the pressing portion 380*a* of the pressing member 380, reference symbol 380*a*3*i* denotes a surface closer to the Z-axis direction in the third portion 380*a*3 of the pressing portion 380*a* of the pressing member 380, reference symbol 3601*e* denotes a collar portion in the center portion of the driven gear 3601, and reference symbol 3602*c* denotes a center line passing through the center of the shaft 3602*s*. The driven gear (the first gear) 3601 is rotatably pivoted to the shaft 3602*s* in the collar portion 3601*e*, and the driving gear (the second gear) 3602 is rotatable with respect to the collar portion 3601*e*, and is set to a state in which it can move and displace in a direction of the shaft 3602*s*, that is, the Z-axis direction. The compression coil spring 391 is fitted to a periphery of the collar portion 3601*e* as illustrated, and applies the elastic restoring force in the −Z-axis direction to the driving gear 3602. The height position holding protruding portion 3602*d* of the driving gear 3602 is engaged with the lower surface (the surface in the Z-axis direction) of the first protruding portion 3601*b* of the driven gear 3601. In the engaged state, the second protruding portion 3602*b* of the driving gear 3602 comes into contact with the side surface in the peripheral direction of the first protruding portion 3601*b* existing in the rotating direction of the driven gear 3601 in a state in which it enters into a space portion between the first protruding portions 3601*b* of the driven gear 3601. A length in the Z-axis direction of the contact portion (an overlapping portion in the axial direction) is set to about $0.5 \times 10^{-3}$ m. Further, the driven gear 3601 and the driving gear 3602 can integrally rotate on the basis of the contact state. A relation between a length in the Z-axis direction of the tooth of the driven gear 3603 and a length in the Z-axis direction of the tooth 3602*a* of the driving gear 3602 is set to such a relation that the engagement between the tooth 3602*a* of the driving gear 3602 and the tooth of the driven gear 3603 is held even in the case that the driving gear 3602 moves and displaces in the Z-axis direction, and the integrally rotatable coupling (the contact state mentioned above) between the second protruding portion 3602*b* of the driving gear 3602 and the first protruding portion 3601*b* of the driven gear 3601 is canceled.

In the following description, the same reference numerals as those of the case in FIG. 7 are attached to the constructing elements of the structure in FIG. 7 used in the following description.

FIG. 8 is a perspective view showing a structure of the emergency eject mechanism in the optical disc apparatus 1 in FIG. 1, and is a view showing a state during the emergency eject motion.

In FIG. 8, for the emergency eject, the pin 400 is inserted from the pin insertion hole 160, and pushes the arm portion (one arm portion) existing closer to the X-axis direction than the rotation supporting point 381*a* provided on the pressing member 380 of the arm member 381 in the Y-axis direction, at a time of moving in the Y-axis direction. The arm member 381 rotates in the clockwise direction around the rotation supporting point 381*a* while moving and displacing in the Y-axis direction against the elastic restoring force of the tension coil spring 382 (FIG. 4). At this time, the contact portion slides on the surface close to the inner surface 320*si* so as to move in the X-axis direction, while the arm portion (the other arm portion) existing closer to the −X-axis direction than the rotation supporting point 381*a* of the arm member 381 keeps in contact with the inner surface si of the side wall 320s in the −Z-axis direction of the chassis 320. Since the arm member 381 moves in the Y-axis direction, the pressing member 380 coupled to the arm member 381 in the rotation supporting point 381a moves in the Y-axis direction, and the pressing portion 380a thereof pushes the pressed portion 390 within the first stage gear unit in the order of the inclined surface portion 390b and the flat surface portion 390a, and moves and displaces the driving gear (the second gear) 3602 in the Z-axis direction together with the pressed portion 390. On the basis of the movement of the driving gear (the second gear 3602), the driving gear 3602 is canceled the integrally rotatable coupling (the contact state) with the driven gear 3601 in the coupling portion in the inner diameter side of the driven gear 3601. In other words, the coupling (the contact state) between the second protruding portion 3602b of the driving gear (the second gear) 3602 and the first protruding portion 3601b of the driven gear (the first gear) 3601 is canceled. The transmission system in the gear train 360 is set to the disconnected state (the off state) by canceling the coupling. Further, when the driving gear 3602 moves and displaces in the Z-axis direction, the driving gear 3602 moves and displaces in a state of being engaged with the driven gear 3603 of the second stage gear unit, and holds the engaged state with the driven gear 3603 even in a state in which the coupling is canceled. After the coupling between the second protruding portion 3602b of the driving gear (the second gear) 3602 and the first protruding portion 3601b of the driven gear (the first gear) 3601 is canceled, a leading end of the pin 400 moving in the Y-axis direction is detached from the arm portion (one arm portion) existing closer to the X-axis direction than the rotation supporting point 381a of the arm member 381, in accordance with the rotation of the arm member 381. The arm member 381 is not pushed by the pin 400 by the detachment, and stops the rotation around the rotation supporting point 381a and the movement in the Y-axis direction.

Even after the arm member 381 stops the rotation and the movement, the pin 400 is moved in the Y-axis direction. On the basis of the movement, the leading end of the pin 400 pushes the function leaver 370, and the disc moving mechanism including the function lever 370 carried out the optical disc discharge as the emergency eject. When the pin 400 carried out the movement after the arm member 381 stops, there is achieved a state in which the one arm portion of the arm member 381 is brought into contact with the side surface portion of the pin 400, and the other arm portion is brought into contact with the inner surface 320si of the side wall 320s of the chassis 320. At this time, the arm portions are held in contact in a state in which the arm portions are pressed to the side surface portion of the pin 400 and the inner surface 320si side of the side wall 320s of the chassis 320 by the elastic restoring force of the tension coil spring 382. The arm member 381 is prevented from the return moving motion in the −Y-axis direction, and the return rotating motion in the counterclockwise direction around the rotation supporting point 381a, by being set to the contact holding state mentioned above, and the return movement in the −Y-axis direction of the pressing portion 380a of the pressing member 380 is prevented.

In the following description, the same reference numerals as those of the case in FIG. 8 are attached, in the case of using the constructing elements as those of the structure in FIG. 8 in the following description.

FIG. 9 is a view showing a state at a time of removing the pressing member 380 in the structure in FIG. 8.

In FIG. 9, reference symbol 381b1 denotes an arm portion, that is, one arm portion existing closer to the X-axis direction than the rotation supporting point 381a, in the arm member 381, and reference symbol 381b2 denotes an arm portion, that is, the other arm portion existing closer to the −X-axis direction than the rotation supporting point 381a, in the arm member 381. In FIG. 9, there is shown a state at a time when the leading end of the pin 400 is already detached from the one arm 381b1 of the arm member 381, moves further in the Y-axis direction, and pushes the function lever 370 in the Y-axis direction. The driving gear (the second gear) 3602 has been already moved and displaced in the Z-axis direction, and the coupling (the contact state) between the second protruding portion 3602b and the first protruding portion 3601b of the driven gear (the first gear) 3601 is canceled. Further, in the arm member 381, the one arm portion 381b1 is brought into contact with the side surface portion of the pin 400, and the other arm portion 381b2 is brought into contact with the inner surface 320si of the side wall 320s of the chassis 320. The rotation supporting point 381a exists between both the contact positions. In this case, the other arm portion 381b2 may be directly brought into contact with the inner surface 320si side of the side wall 320s of the chassis 320, or may be indirectly brought into contact therewith via a plate-like member or the like.

In the following description, the same reference numerals as those of the case of FIG. 9 are attached in the case of using the constructing elements of the structure in FIG. 9.

FIG. 10 is a cross sectional view in an axial direction of the first stage gear unit, and is a view showing a structure at a time when the first stage gear unit exists in the state in FIG. 8.

In FIG. 10, the surface 380ali closer to the Z-axis direction in the first portion 380a1 of the pressing portion 380a of the pressing member 380 pushes the flat surface portion 390a of the pressed portion 390 in the Z-axis direction against the elastic restoring force of the compression coil spring 391. The state is formed by the movement and displacement of the pressing portion 380a of the pressing member 380 from the position in the state shown in FIG. 7 in the Y-axis direction. In the pressing portion 380a, the surface 380a3i closer to the Z-axis direction in the third portion 380a3 first comes into contact with the inclined surface portion 390b of the pressed portion 390 on the basis of the movement and displacement in the Y-axis direction, and pushes the inclined surface portion 390b in the Z-axis direction while slipping on the inclined surface portion 390b. Next, the surface 380a2i closer to the Z-axis direction in the second portion 380a2 of the pressing portion 380a comes into contact with the inclined surface portion 390b of the pressed portion 390, and pushes the inclined surface portion 390b in the Z-axis direction while slipping on the inclined surface portion 390b. Next, the surface 380ali closer to the Z-axis direction in the first portion 380a1 of the pressing portion 380a comes into contact with the inclined surface portion 390b of the pressed portion 390, and pushes the inclined surface portion 390b in the Z-axis direction while slipping on the inclined surface portion 390b. Finally, the surface 380ali closer to the Z-axis direction in the first portion 380a1 of the pressing portion 380a comes into contact with the flat surface portion 390a of the pressed portion 390, and pushes the flat surface portion 390a in the Z-axis direction. As mentioned above, since the pressing portion 380a of the pressing member 380 moves and displaces in the Y-axis direction, the pressed portion 390 is pushed in the Z-axis direction so as to move, the driving gear 3602 moves and displaces in the Z-axis direction on the basis of the movement of the pressed portion 390, and the coupling (the contact state) between the second protruding portion 3602b of the driving gear 3602 and the first protruding portion 3601b of the driven gear 3601 is canceled, whereby the driving gear 3602 is canceled its integral state with respect to the driven gear 3601 so as to be rotatable independently. In the case that the coupling between the second protruding portion 3602b and the first protruding portion 3601b is canceled, the engagement between the tooth 3602a of the driving gear 3602 and the tooth of the driven gear 3603 is held.

FIG. 11 is a view explaining a motion of the arm member 381 of the emergency eject mechanism in the optical disc apparatus 1 in FIG. 1.

In FIG. 11, reference numeral 37 denotes a disc moving mechanism, and reference symbol 400a denotes a surface of the pin 400. If the pin 400 is inserted into the apparatus in the Y-axis direction through the pin insertion hole 16 of the front panel 13 and the pin insertion hole 160 of the chassis 320 at a time of the emergency eject, the leading end of the pin 400 pushes the arm member 381 by moving in the Y-axis direction, and changes the state of the arm member 381 in the order of a state A, a state B and a state C.

(state A): The leading end of the pin 400 comes into contact with the one arm portion 381b1 existing closer to the X-axis direction than the rotation supporting point 381a of the arm member 381 by a point a1, at a Y-axis direction position P1, and pushes the arm member 381 in the Y-axis direction against the elastic restoring force of the tension coil spring 382 (FIG. 4). At this time, the other arm portion 381b2 existing closer to the −X-axis direction than the rotation supporting point 381a of the arm member 381 comes into contact with the inner surface 320si of the side wall 320s of the chassis 320 by a point a2. At the point a2, the arm member 381 is pressed against the inner surface 320si of the side wall 320s of the chassis 320 by the elastic restoring force of the tension coil spring 382 (FIG. 4).

(state B): The pin 400 moves further in the Y-axis direction, and the leading end thereof pushes the one arm portion 381b1 of the arm member 381, and rotates the one arm portion 381b1 in the clockwise direction around the rotation supporting point 381a as well as moving and displacing the one arm portion 381b1 in the Y-axis direction. The leading end of the pin 400 comes into contact with the one arm portion 381b1 of the arm member 381 by a point b1, at a Y-axis direction position P2, and pushes the arm member 381 in the Y-axis direction against the elastic restoring force of the tension coil spring 382 (FIG. 4). At this time, the other arm portion 381b2 of the arm member 381 comes into contact with the inner surface 320si of the side wall 320s of the chassis 320 by a point b2. Even at the point b2, the arm member 381 is pressed against the inner surface 320si of the side wall 320s of the chassis 320 on the basis of the elastic restoring force of the tension coil spring 382 (FIG. 4). The point b1 exists at a position which is closer to the leading end of the arm portion 381b1 than the point a1 in the state A, on the one arm portion 381b1 of the arm member 381, and the point b2 exists at a position which is closer to the pin 400 than the point a2 in the state A, in the inner surface 320si side of the side wall 320s of the chassis 320. In the present state B, the pressing portion 380a of the pressing member 380 starts pushing the pressed portion 390 of the driving gear 3602.

(state C): The pin 400 moves further in the Y-axis direction, the leading end thereof is detached from the one arm portion 381b1 of the arm member 381, and the movement in the Y-axis direction and the rotation around the rotation supporting point 381a of the one arm portion 381b1 are stopped. The one arm portion 381b1 of the arm member 381 comes into contact with the side surface of the pin 400 by a point c1, at a Y-axis direction position P4, and the one arm portion 381b1 of the arm member 381 is pressed against the side surface of the pin 400 on the basis of the elastic restoring force of the tension coil spring 382 (FIG. 4). At this time, the other arm portion 381b2 of the arm member 381 comes into contact with the inner surface 320si of the side wall 320s of the chassis 320 by a point c2. Even at the point c2, the arm member 381 is pressed against the inner surface 320si of the side wall 320s of the chassis 320 on the basis of the elastic restoring force of the tension coil spring 382 (FIG. 4). The point c1 exists at a position which is closer to the leading end of the arm portion 381b1 than the point b1 in the state B, on the one arm portion 381b1 of the arm member 381, and the point c2 exists at a position which is closer to the pin 400 than the point b2 in the state B, in the inner surface 320si side of the side wall 320s of the chassis 320. In the present state C, the pressing portion 380a of the pressing member 380 pushes the pressed portion 390 of the driving gear 3602 so as to move and displace in the Z-axis direction, and sets to a state of canceling the coupling (the contact state) of the driving gear 3602 with the driven gear 3601.

The pin 400 moves in the Y-axis direction while the one arm portion 381b1 of the arm member 381 is kept being pressed against the surface 400a thereof, and the leading end thereof pushes the function lever 370 at a Y-axis direction position P4. The pin 400 moves further in the Y-axis direction, moves and displaces the function lever 370 in the Y-axis direction, and makes the disc moving mechanism 37 discharge (emergency eject) the optical disc. Reference symbol q-q denotes a straight line indicating a moving direction of the rotation supporting point 381a of the arm member 381.

FIG. 12 is a view showing a displacing state of each of the portions in the emergency eject motion of the emergency eject mechanism in the optical disc apparatus 1 in FIG. 1.

In FIG. 12, (a) shows a moving displacement $\zeta a$ in the Y-axis direction of the pin 400, (b) shows a moving displacement $\zeta b$ in the Y-axis direction of the arm member 381, (c) shows a moving displacement $\zeta c$ in the Y-axis direction of the pressing member 380, (d) shows a moving displacement $\zeta d$ in the Z-axis direction of the driving gear 3602 corresponding to the second gear, (e) shows a position at which the coupling between the driven gear (the first gear) 3601 and the driving gear (the second gear) 3602 in the first stage gear unit is canceled, (f) shows a moving displacement $\zeta f$ in the Y-axis direction of the function lever 370 corresponding to the disc moving mechanism 37, and (g) shows a moving displacement $\zeta g$ in the −Y-axis direction of the optical disc, respectively. In FIG. 12, reference symbol Po denotes a Y-axis direction position of the leading end of the pin 400 at a time of being started being inserted to the pin insertion hole 16 of the front panel 13 (being started being emergency ejected).

If the pin 400 is inserted from the pin insertion hole 16, the leading end of the pin 400 comes into contact with the arm portion 381b1 of the arm member 381 at the Y-axis direction position P1, and pushes the arm portion 381b1 in the Y-axis direction. As a result, the arm member 381 starts moving and displacing in accordance with a characteristic of the displacement $\zeta b$ in the Y-axis direction at the Y-axis direction position P1 ((b)). The pressing member 380 coupled to the arm member 381 at the rotation supporting point 381a also starts moving and displacing in accordance with a characteristic of the displacement $\zeta c$ in the Y-axis direction at the Y-axis direction position P1 ((c)). When the leading end of the pin 400 moves further in the Y-axis direction, and comes to the Y-axis direction position P2, the pressing portion 380a of the pressing member 380 pushes the pressed portion 390 of the driving gear (the second gear) 3602 within the first stage gear unit in the Z-axis direction. As a result, the driving gear (the second gear) 3602 starts moving and displacing in accordance with a characteristic of the displacement $\zeta d$ in the Z-axis direction, at the Y-axis direction position P2. Thereafter, the coupling between the first protruding portion 3601b of the driven gear (the first gear) 3601 and the second protruding portion 3602b of the driving gear (the second gear) 3602 is turned off at a Y-axis direction position P3 at which the driving gear (the second gear) 3602 moves and displaces at a displacement ζdz in the Z-axis direction ((d)). Since the coupling between both the protruding portions 3601b and 3602b is turned off, the coupling between the driven gear (the first gear) 3601 and the driving gear (the second gear) 3602 is canceled at the Y-axis direction position P3((e)).

When the leading end of the pin 400 moves further in the Y-axis direction and comes to the Y-axis direction position P4, the leading end of the pin 400 is detached from the one arm portion 381b1 of the arm member 381 (a state C in FIG. 11). As a result, the movement in the Y-axis direction of the arm member 381 and the pressing member 380 is stopped. The arm member 381 and the pressing member 380 are held at the stop position. When the leading end of the pin 400 moves further in the Y-axis direction and comes to the Y-axis direction position P5, it comes into contact with the function lever 370 serving as the disc moving mechanism 37, however, since the driving gear 3602 has been already canceled the coupling with the driven gear 3601 at this time, the pin 400 can move and displace the function lever 370 in the Y-axis direction in accordance with a characteristic of the displacement ζf without being applied the load in the loading motor 350 side from the driven gear 3601 via the function lever 370, the driving gear 3602 and the like ((f)). On the basis of the movement and displacement of the function lever 370, the optical disc within the apparatus starts discharging and moving in accordance with a characteristic of the displacement ζg in the −Y-axis direction, by the disc moving mechanism 37, at a time when the leading end of the pin 400 comes to a Y-axis direction position P6 ((g)). When the leading end of the pin 400 comes to a Y-axis direction position P7, the optical disc is discharged from the opening 13a of the front panel 13 by the disc moving mechanism 37, and the emergency eject is finished.

After the end of the emergency eject, the pin 400 is taken out of the pin insertion holes 160 and 16. If the pin 400 is taken out, the arm member 381 is canceled its contact state with the surface 400a of the pin 400 on the basis of the elastic restoring force of the tension coil spring 382, and rotates in a counterclockwise direction around the rotation supporting point 381a, and the pressing member 380 moves in the −Y-axis direction so as to evacuate the pressing portion 380a in the −Y-axis direction from the pressed portion 390 of the driving gear (the second gear) 3602. At this time, if the first protruding portion 3601b of the driven gear (the first gear) 3601 and the second protruding portion 3602b of the driving gear (the second gear) 3602 do not overlap within an XY plane, the driving gear 3602 moves and displaces in the −Z-axis direction on the basis of the elastic restoring force of the compression coil spring 391 while being engaged with the driven gear 3603 of the next stage gear unit, the second protruding portion 3602b enters into the space portion between the adjacent first protruding portions 3601b, and both the protruding portions 3601b and 3602b come back to a state in which they are coupled to each other. In this state, the height position holding protruding portion 3602d on the driving gear 3602 comes to a state of being engaged with the first protruding portion 3601b of the driven gear 3601. In the case that the first protruding portion 3601b of the driven gear (the first gear) 3601 and the second protruding portion 3602b of the driving gear (the second gear) 3602 overlap within the XY plane, if the power supply of the optical disc apparatus 1 is thereafter set to an on state and the loading motor 350 is rotationally driven, the driven gear 3601 rotates via the worm gear 351 on the basis of the rotation of the loading motor 350, the second protruding portion 3602b enters into the space between the adjacent first protruding portions 3601b, and both the protruding portions 3601b and 3602b come back to the state in which they are coupled to each other. In order to smoothly carry out the returning motion, the second protruding portion 3602b of the driving gear 3602 is structured such as to be somewhat smaller (about 5 degree at an opening angle with respect to the center shaft 3602c smaller) than the interval in the peripheral direction between the first protruding portions 3601b of the driven gear 3601. Next, the protruding portion 3601b of the driven gear 3601 comes into contact with the second protruding portion 3602b of the driving gear 360, the driving gear 3602 rotates, and the driving force is transmitted to the function lever 370 via the driven gear 3603, the driving gear 3604, the driven gear 3605 and the like. Accordingly, the function lever 370 moves and displaces, and the disc moving mechanism 37 comes back to the initial state.

In accordance with the optical disc apparatus 1 corresponding to the embodiment of the present invention, it is possible to carry out the emergency eject while holding the engagement between the gears having different axes, that is, between the driving gear 3602 and the next stage driven gear 3603, in the gear train 360 between the loading motor 350 and the disc moving mechanism 37. As a result, it is possible to do away with a damage and a deterioration of the tooth caused by the attaching and detaching motion between the teeth in the gears, and it is possible to secure a reliability as the optical disc apparatus. Further, the mechanism for regulating the axial position of the gear and the mechanism for guiding the axial movement are not necessary, and it is easy to downsize the gear train and make the gear train thin.

In this case, the pressing portion 380a in the pressing member 380 may be structured integrally with the pressing member 380, or may be structured as an independent part from the pressing member 380. Further, the pressed portion 390 of the driving gear 3602 may be structured integrally with the driving gear 3602, or may be structured as an independent part from the driving gear 3602. Further, the arm portion 381b2 of the arm member 381 may directly come into contact with the inner surface 320si side of the side wall 320s of the chassis 320, or may indirectly come into contact via a plate-like member, a sheet-like member or the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc apparatus capable of carrying out an emergency eject motion of an optical disc, comprising:
   a disc moving mechanism moving said optical disc in an inner portion of the apparatus;
   a loading motor generating a driving force for driving said disc moving mechanism; and
   a transmission system structured such as to be provided with a gear and transmitting the driving force of said loading motor to said disc moving mechanism,
   wherein said transmission system is provided with a driven gear receiving the driving force from a gear in a previous stage, and a driving gear arranged so as to be coaxial with said driven gear and applying a driving force to a gear in the next stage, said driving gear is coupled in an inner diameter side of said driven gear so as to be movable in an axial direction and be rotatable integrally with said driven gear, said driving gear is structured such that said coupling with said driven gear is canceled in a state of being kept engaged with the gear in the next stage, by moving and displacing in an axial direction with respect to said driven gear.

2. An optical disc apparatus capable of carrying out an emergency eject motion of an optical disc, comprising:
  a disc moving mechanism moving said optical disc in an inner portion of the apparatus;
  a loading motor generating a driving force for driving said disc moving mechanism; and
  a gear train forming a transmission system transmitting the driving force of said loading motor to said disc moving mechanism,
  wherein said gear train is structured such as to be provided with a plurality of gear units each having a driven gear receiving the driving force from a gear in a previous stage, and a driving gear arranged so as to be coaxial with said driven gear and applying a driving force to a gear in the next stage,
  wherein at least one of said plurality of gear units is structured such that a second gear corresponding to a driving gear is coupled in an inner diameter side of a first gear corresponding to a driven gear so as to be movable in an axial direction and be rotatable integrally with said driven gear, and said second gear is canceled said coupling with said first gear in a state of being engaged with the gear in the next gear, by moving and displacing in an axial direction with respect to said first gear, and
  wherein said coupling with said first gear is canceled by moving and displacing said second gear in the axial direction by an external force, at a time of an emergency eject, and said transmission system is set to a disconnection state so as to make said disc moving mechanism carry out a disc discharging motion and discharge said optical disc out of the apparatus.

3. An optical disc apparatus as claimed in claim 2, wherein said first gear has a plurality of first protruding portions protruding to an inner side in a radial direction in a portion close to an inner diameter coupled to said second gear, said second gear has a plurality of second protruding portions protruding to an outer side in the radial direction and having a smaller width in a peripheral direction than an interval in the peripheral direction between said first protruding portions, said coupling between said first and second gears is canceled in the case that said second gear moves and displaces in the axial direction and said second protruding portion does not lap over said first protruding portion in the axial direction, whereby the transmission system by said gear train is set to a disconnected state.

4. An optical disc apparatus as claimed in claim 3, wherein said first gear is structured such as to be engaged with a gear coupled to an axis of rotation of said loading motor.

5. An optical disc apparatus as claimed in claim 2, wherein said first gear is structured such as to be engaged with a gear coupled to an axis of rotation of said loading motor.

6. An optical disc apparatus as claimed in claim 2, wherein said second gear is structured such as to be provided with a pressed portion having an inclined surface formed in a whole periphery, at a position pushed by said pressing member.

7. An optical disc apparatus as claimed in claim 2, wherein said one gear unit is provided with a spring between said first gear and said second gear, and is structured such that said second gear is pushed in the axial direction by an elastic restoring force of said spring.

8. An optical disc apparatus capable of carrying out an emergency eject motion of an optical disc, comprising:
  a disc moving mechanism moving said optical disc in an inner portion of the apparatus;
  a loading motor generating a driving force for driving said disc moving mechanism;
  a gear train arranged between said loading motor and said disc moving mechanism, and forming a transmission system transmitting the driving force of said loading motor to said disc moving mechanism;
  a pressing member moving in the same direction as a direction in which an optical disc is pulled in so as to apply a pressing force in an axial direction to at least one gear in said gear train;
  an arm member coupled to said pressing member at a rotation supporting point provided on said pressing member and having an arm portion extending to both sides of said rotation supporting point and being rotatable around said rotation supporting point;
  a spring applying an elastic restoring force in a direction opposing to said movement to said pressing member; and
  a chassis to which said disc moving mechanism, said loading motor and said gear train are attached,
  wherein said gear train is structured such as to be provided with a plurality of gear units each having a driven gear receiving the driving force from a gear in a previous stage, and a driving gear arranged so as to be coaxial with said driven gear and applying a driving force to a gear in the next stage, at least one of said plurality of gear units is structured such that a second gear corresponding to a driving gear is coupled in an inner diameter side of a first gear corresponding to a driven gear so as to be movable in an axial direction and be rotatable integrally with said driven gear, and said second gear is canceled said coupling with said first gear in a state of being engaged with the gear in the next gear, by moving and displacing in an axial direction with respect to said first gear,
  wherein said arm member is structured such that when a pin for an emergency eject motion is inserted to the apparatus, one arm portion of said arm portions is pressed by a leading end of said pin, and the other arm portion rotates around said rotation supporting point while moving in the same direction as a direction in which an optical disc is pulled in against an elastic restoring force of said spring while keeping a state in which the other arm portion comes into contact with an inner surface side of said chassis, and stops moving and rotating at a time when the leading end of said pin is detached from said one arm portion,
  wherein said pressing member is structured such as to move in the same direction as the direction in which the optical disc is pulled in against the elastic restoring force of said spring on the basis of said movement of said arm member, apply a pressing force in the axial direction to said second gear of said one gear unit so as to move and displace said second gear in said axial direction on the basis of said movement, and cancel said coupling with said first gear, and
  wherein in the case that said coupling of said second gear with said first gear is canceled, and said transmission system is set to a disconnection state, said pin further moves so as to make said disc moving mechanism carry out a disc discharging motion and discharge said optical disc out of the apparatus.

9. An optical disc apparatus as claimed in claim 8, wherein said first gear has a plurality of first protruding portions protruding to an inner side in a radial direction in a portion close to an inner diameter coupled to said second gear, said second gear has a plurality of second protruding portions protruding to an outer side in the radial direction and having a smaller width in a peripheral direction than an interval in the peripheral direction between said first protruding portions, said coupling between said first and second gears is canceled in the case that said second gear moves and displaces in the axial direction and said second protruding portion does not lap over said first protruding portion in the axial direction, whereby the transmission system by said gear train is set to a disconnected state.

10. An optical disc apparatus as claimed in claim 8, wherein said first gear is structured such as to be engaged with a gear coupled to an axis of rotation of said loading motor.

11. An optical disc apparatus as claimed in claim 8, wherein said second gear is structured such as to be provided with a pressed portion having an inclined surface formed in a whole periphery, at a position pushed by said pressing member.

12. An optical disc apparatus as claimed in claim 8, wherein said one gear unit is provided with a spring between said first gear and said second gear, and is structured such that said second gear is pushed in the axial direction by an elastic restoring force of said spring.

13. An optical disc apparatus as claimed in claim 8, wherein said arm member is structured such that in the case of stopping said movement and the rotation, said one arm portion comes into contact with a side surface of said pin, said other arm portion comes into contact with an inner surface side of said chassis, and said rotation supporting point exists between said both contact positions.

* * * * *